United States Patent
Longhurst et al.

(10) Patent No.: US 6,935,655 B2
(45) Date of Patent: Aug. 30, 2005

(54) PYROTECHNIC INFLATOR FOR A VEHICULAR AIRBAG SYSTEM

(75) Inventors: Nyle K. Longhurst, Layton, UT (US); Marcus T. Clark, Kaysville, UT (US)

(73) Assignee: Autoliv ASP, Inc., Ogden, UT (US)

( * ) Notice: Subject to any disclaimer, the term of this patent is extended or adjusted under 35 U.S.C. 154(b) by 142 days.

(21) Appl. No.: 10/408,992

(22) Filed: Apr. 8, 2003

(65) Prior Publication Data

US 2004/0201208 A1 Oct. 14, 2004

(51) Int. Cl.$^7$ .............................................. B60R 21/26
(52) U.S. Cl. ........................ 280/736; 280/741; 102/531
(58) Field of Search ................. 280/736, 740, 280/741, 742, 737; 102/530, 531

(56) References Cited

U.S. PATENT DOCUMENTS

| | | | |
|---|---|---|---|
| 5,582,428 A | 12/1996 | Buchanan et al. | |
| 5,613,705 A | 3/1997 | Hock et al. | |
| 5,765,866 A | 6/1998 | Canterbury et al. | |
| 5,845,933 A | * 12/1998 | Walker et al. | 280/736 |
| 5,887,893 A | 3/1999 | Lang et al. | |
| 5,964,479 A | 10/1999 | Rink et al. | |
| 6,007,098 A | 12/1999 | Olson et al. | |
| 6,170,868 B1 | * 1/2001 | Butt et al. | 280/741 |
| 6,199,906 B1 | 3/2001 | Trevillyan et al. | |
| 6,237,498 B1 | * 5/2001 | Winterhalder et al. | 280/741 |
| 6,488,310 B1 | 12/2002 | Ryobo et al. | |
| 2002/0190511 A1 | * 12/2002 | Watase et al. | 280/740 |

FOREIGN PATENT DOCUMENTS

| | | | | |
|---|---|---|---|---|
| DE | 19541924 A1 | * 5/1997 | ........... B60R/21/26 |
| EP | 0 602 862 A1 | 6/1994 | |
| WO | WO-02/42126 A1 | 5/2002 | |

* cited by examiner

*Primary Examiner*—Peter C. English
(74) *Attorney, Agent, or Firm*—Sally J. Brown (57) ABSTRACT

A pyrotechnic inflator for an airbag module is disclosed. The pyrotechnic inflator may have a generally tubular housing that contains an initiator, a baffle, and a quantity of inflation gas generant. The generant is disposed in a compartment defined by the baffle. The baffle has a passageway with a first end and a second end. Direct fluid communication between the first and second ends is restricted by a blockage within the passageway. Upon receipt of an activation signal, the initiator directs initiation gas into the first end. The initiation gas may exit the first end through a plurality of first end holes to reach and ignite the generant with or without requiring any intermediate igniter material. The generant combusts to produce inflation gas, which enters the second end of the passageway through a plurality of second end holes. The inflation gas exits the inflator to inflate a cushion.

36 Claims, 3 Drawing Sheets

PYROTECHNIC INFLATOR FOR A VEHICULAR AIRBAG SYSTEM

BACKGROUND OF THE INVENTION

1. Field of the Invention

The present invention relates to systems and methods for protecting vehicle occupants from injury. More specifically, the present invention relates to a pyrotechnic inflator with a baffle that provides simplified initiation gas delivery and inflation gas collection.

2. Description of Related Art

The inclusion of inflatable safety restraint devices, or airbags, is now a legal requirement for many new vehicles. Airbags are typically installed in the steering wheel and in the dashboard on the passenger side of a car. In the event of an accident, an accelerometer within the vehicle measures the abnormal deceleration and triggers the expulsion of rapidly expanding gases from an inflator. The expanding gases fill the airbags, which immediately inflate in front of the driver and passenger to protect them from impact against the windshield.

Side impact airbags such as inflatable curtains and seat mounted airbags have also been developed in response to the need for protection from impacts in a lateral direction, or against the side of the vehicle. Other airbags such as knee bolsters and overhead airbags also operate to protect various part of the body from collision.

Known inflators generally fall into three categories: pyrotechnic inflators, compressed gas inflators, and hybrid inflators. Pyrotechnic inflators depend solely on combustion to provide inflation gas, while compressed gas inflators may use only a minimal amount of pyrotechnic that opens a chamber to release the inflation gas from a compressed state. Hybrid inflators use a combination of combustion and compressed gas storage to provide the inflation gas to fill the cushion.

Pyrotechnic inflators typically have an initiator that combusts very rapidly to produce heated initiation gas. The initiation gas typically causes the ignition of an igniter material stored adjacent to the initiator. The additional hot gases provided by combustion of the igniter are then exposed to a generant that generates the main portion of the inflation gas to inflate the cushion. Various members may be used to distribute the inflation gas to the generant or collect the inflation gas from the combusted generant for expulsion into the cushion.

The igniter material, distribution members, and collection members add to the complexity of the inflator. Several steps must be taken to assemble the inflator. Hence, the overall cost of the inflator is increased. The cost of the inflator adds to the cost of the airbag module.

Accordingly, a need exists for an inflator and related methods that remedy the problems found in the prior art. Such an inflator should preferably provide relatively even and rapid inflation of the associated airbag cushion. Such an inflator should also preferably be simple and inexpensive to manufacture and install.

SUMMARY OF THE INVENTION

The apparatus of the present invention has been developed in response to the present state of the art, and in particular, in response to the problems and needs in the art that have not yet been fully solved by currently available inflators. Thus, it is an overall objective of the present invention to provide an inflator and related systems and methods that provides rapid, even inflation with a minimum of manufacturing and installation cost.

To achieve the foregoing objective, and in accordance with the invention as embodied and broadly described herein in one embodiment, an airbag module is installed in a vehicle to protect at least one occupant of the vehicle from impact. The airbag module has a cushion designed to inflate, for example, to the side of the occupant by deploying from a folded position within the occupant's seat. The cushion is inflated by a pyrotechnic inflator.

The inflator has a housing with a generally tubular shape. The housing contains a plug/initiator assembly, a can, an orifice plate, and a screen. The can forms a hermetic seal around a baffle and a quantity of generant designed to produce inflation gas. The housing has a first end and a second end with a plurality of outlet ports distributed about the second end.

The can is open at one end. The open end is plugged in airtight fashion by the plug/initiator assembly. The plug/initiator assembly has a receptacle with pins designed to receive an electric activation signal and to convey the activation signal to a combustion head. The combustion head is disposed in the interior of the can.

The baffle has a wall with a generally tubular configuration. The wall has a first end disposed within the first end of the housing and a second end of the second end of the housing. The wall also has a central portion between the first and second ends. A blockage is formed in the central portion, for example, by pressing three sides of the central portion inward toward each other to form a three-way crimp. The wall is integrally formed with a flange that extends generally perpendicular to the wall.

The baffle defines a compartment for storing the generant within the can. The compartment has a generally annular shape between the can and the wall of the baffle. The wall also defines a passageway within the baffle. The passageway has a first end disposed at the first end of the wall and a second end disposed at the second end of the wall. The first end has a first aperture and a plurality of first end holes that permit fluid communication between the first end of the passageway and the compartment. The second end similarly has a second aperture and a plurality of second end holes that permit fluid communication between the second end of the passageway and the compartment.

The second end of the passageway is adjacent to an outlet portion of the can. The outlet portion is adjacent to an outlet orifice formed in the orifice plate. The orifice plate is disposed between the can and the screen so that gas can flow from the second end, through the outlet portion and the outlet orifice, through the screen, and out of the housing through the outlet ports of the housing.

When the plug/initiator assembly receives the activation signal, the combustion head ignites to produce initiation gas. The initiation gas moves through the first end of the passageway, but is hindered from entering the second end directly due to the presence of the blockage. Hence, the initiation gas enters the compartment through the first end holes to ignite the generant. If required, additional pyrotechnic material may be added inside the first end of the passageway to augment the initiation gas. However, it may be desirable to avoid adding the additional pyrotechnic material.

The generant combusts to produce inflation gas, which enters the second end from the compartment through the second end holes. The inflation gas moves through the second end, through the outlet portion, through the outlet orifice, and into the screen. The screen absorbs heat and captures particles from the inflation gas, and the cooled and cleansed inflation gas exits the housing through the outlet ports of the housing.

The inflator is relatively easy to manufacture. According to one method, the housing is first provided by progressive stamping, extrusion, or any other known process. The outlet ports are formed in the second end of the housing, and the screen is inserted into the housing via the first end, which is open. The screen is pressed to the second end and the second end is crimped proximate the center-facing end of the screen. The orifice plate is inserted into the first end and moved to a position abutting the crimp. Alternatively, the orifice plate may be inserted prior to crimping.

The baffle is inserted into the can and the generant is inserted into the compartment within the can, external to the baffle. The can, together with the baffle and the generant, is then inserted into the first end of the housing and moved to a position abutting the orifice plate. The plug/initiator assembly is inserted into the first end in such a manner that the plug/initiator assembly abuts and hermetically seals the open end of the can, and the combustion head simultaneously enters partway into the first end of the baffle passageway. The first end of the housing is also crimped to keep the plug/initiator assembly and the other components in place.

According to alternative embodiments, the baffle may be configured somewhat differently. For example, in one alternative embodiment, the blockage is not formed by a three-way crimp, but is created by a simple two-way crimp in which the central portion is flattened. In another alternative embodiment, the central blockage is formed by attaching a separate plug to the interior of the central portion.

Through the use of the inflators of the present invention, cost savings may be obtained through the elimination of igniter materials and multiple part gas delivery/collection systems. Additionally, more rapid and even inflation of the inflatable curtains may be obtained. As a result, the availability and effectiveness of vehicular airbag systems may be enhanced.

These and other objects, features, and advantages of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained will be readily understood, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

The presently preferred embodiments of the present invention will be best understood by reference to the drawings, wherein like parts are designated by like numerals throughout. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in FIGS. 1 through 5, is not intended to limit the scope of the invention, as claimed, but is merely representative of presently preferred embodiments of the invention.

The present invention provides an apparatus and method whereby problems associated with previously known inflators can be resolved. More specifically, through the strategic use of internal gas diffusion, igniter materials may be omitted from the inflator design to avoid the expense of the igniter material. Furthermore, such a construction may simplify the manufacture and assembly of the inflator.

Yet further, the use of a single baffle structure to provide both internal diffusion and inflation gas collection further simplifies the inflator manufacture and assembly. Such a configuration may provide more consistent and predictable inflation. Hence, the airbag deploys comparatively evenly to provide effective occupant protection. The manner in which these principles are utilized in the present invention will be shown and described in greater detail in the following discussion.

For this application, the phrases "connected to," "coupled to," and "in communication with" refer to any form of interaction between two or more entities, including mechanical, electrical, magnetic, electromagnetic, and thermal interaction. The phrase "attached to" refers to a form of mechanical coupling that restricts relative translation or rotation between the attached objects. The phrases "pivotally attached to" and "slidably attached to" refer to forms of mechanical coupling that permit relative rotation or relative translation, respectively, while restricting other relative motion.

The phrase "attached directly to" refers to a form of attachment by which the attached items are either in direct contact, or are only separated by a single fastener, adhesive, or other attachment mechanism. The term "abutting" refers to items that are in direct physical contact with each other, although the items may not be attached together. The terms "integrally formed" refer to a body that is manufactured unitarily, i.e., as a single piece, without requiring the assembly of multiple pieces. Multiple parts may be integrally formed with each other if they are formed from a single workpiece.

Figure 1:
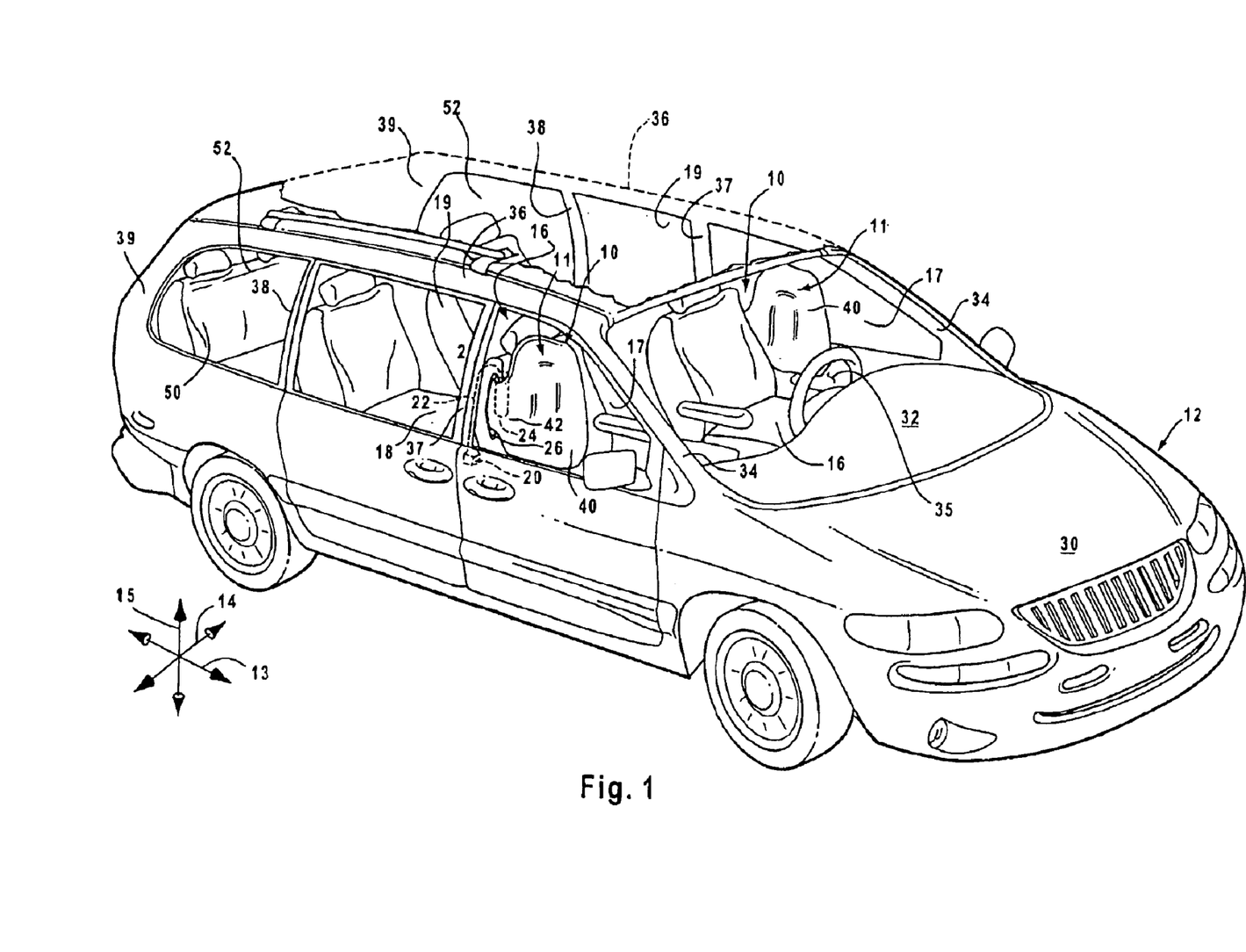
FIG. 1 is a perspective view of a vehicle with an inflatable curtain that incorporates one embodiment of an inflator according to the invention.

Referring to FIG. 1, a pair of airbag modules 10 are illustrated according to one possible embodiment of the invention. Each of the airbag modules 10 has a cushion 11 designed to inflate to protect one or more occupants of a vehicle 12. The airbag modules 10 may form part of an airbag system with additional airbag modules designed to protect vehicle occupants from different types of impact.

The vehicle 12 has a longitudinal direction 13, a lateral direction 14, and a transverse direction 15. The vehicle 12 further has front seats 16 laterally displaced from first lateral surfaces 17, or front doors 17, as shown in the vehicle 12 of FIG. 1. The vehicle 12 also has rear seats 18 laterally displaced from second lateral surfaces 19, or rear doors 19, as depicted. As shown, two such airbag modules 10 may be used: one for the driver's side of the vehicle 12, and the other for the passenger's side.

One or more accelerometers 20 or other impact sensing devices detect sudden lateral acceleration (or deceleration) of the vehicle 12 and transmit electric signals via electric lines 22 to one or more inflators 24 that provide pressurized gas to inflate the cushions 11. As shown in FIG. 1, a separate inflator 24 may be used to inflate each of the cushions 11.

As shown, the inflators 24 are disposed within the front seats 16. The cushions 11 are compacted and stored within the seats 16 until deployment occurs. The cushions 11 then deploy through deployment seams 26 formed in the seats 16. The deployment seams 26 may utilize break-away stitching or some other mechanism to enable the deployment seams 26 to open rapidly and release the cushions 11. As illustrated, the cushions 11 inflate forward, between the occupants of the front seats 16 and the front doors 17.

The inflators 24 of the embodiment depicted in FIG. 1 are pyrotechnic, and therefore produce inflation gas substantially through combustion. Alternative embodiments may utilize different inflator types. The inflators provide inflation gas to inflate the cushions 11 in response to receipt of activation signals. In the exemplary configuration of FIG. 1, the inflators 24 are partially enveloped within the cushions 11 so that inflation gases exiting the inflators 24 flow directly into the cushions 11. The inflators 24 may operate with such rapidity that, before the vehicle 12 has fully reacted to the impact, the cushions 11 have inflated to protect vehicle occupants from impact.

Optionally, the accelerometers 20 may be stowed within an engine compartment 30 or dashboard 32 of the vehicle 12. A controller (not shown) may also be used to process the output from the accelerometer 20 and control various other aspects of a vehicle safety system of the vehicle 12. If the accelerometers 20 are remotely positioned, the electric lines 22 and/or other control wiring may run through the front seats 16 to the floor of the vehicle 12, and thence to any desirable location within the vehicle 12. Otherwise, each accelerometer 20 may be positioned near one of the inflators 24, as shown in FIG. 1.

The airbag modules 10 shown in FIG. 1 represent only one potential configuration according to the invention. Those of skill in the art will recognize that the principles of the invention could be readily applied to a wide variety of airbag types, including driver's and passenger's side front impact airbags, knee bolsters, inflatable curtains, and overhead airbags. Such airbags may, for example, be coupled to a pair of A pillars 34 disposed on either side of a windshield 35, to roof rails 36, to B pillars 37, C pillars 38, and/or D pillars 39 disposed rearward of the A pillars 34, or to any other suitably disposed interior part of the vehicle 12.

Each cushion 11 may have a protection zone 40 configured to receive the impact of the vehicle occupant. Each cushion 11 also has an inlet port 42 in which the corresponding inflator 24 is disposed. The inflators 24 release inflation gas directly into the inlet ports 42 of the cushions 11.

Airbag modules similar to the airbag modules 10 illustrated in FIG. 1 may also be installed in the rear seats 18 to protect occupants of rear seats 18 of the vehicle 12. The vehicle 12 may also have extra seats 50 disposed behind the rear seats 18. Airbag modules like the airbag modules 10 illustrated in FIG. 1 may also be installed in the extra seats 50 to protect occupants of the extra seats 50 from lateral impact against third lateral surfaces 52 of the vehicle 12.

The inflators 24 may be uniquely configured to provide rapid, even inflation as well as simple and inexpensive manufacturing and installation. The configuration of the inflators 24 will be described in greater detail in connection with FIG. 2.

Figure 2:
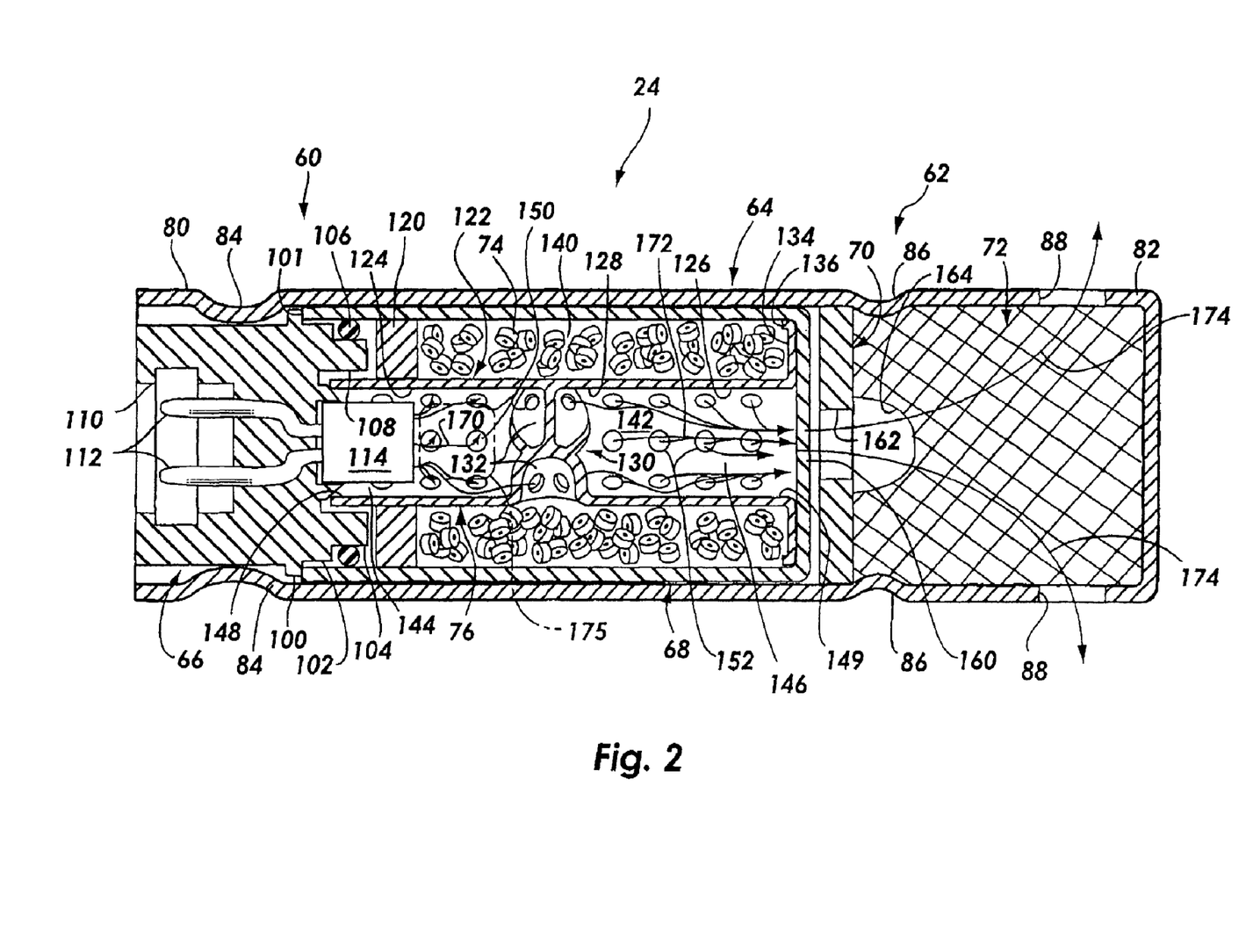
FIG. 2 is a side elevation, cross sectional view of the inflator of FIG. 1.

Referring to FIG. 2, a side elevation, cross sectional view of the inflator 24 is shown. The inflator 24 has a first end 60 in which the activation signal is received and a second end 62 from which inflation gas is ejected. The second end 62 may be contained within the inlet port 42 of the cushion 11, while the first end 60 is exposed for connection to the associated electric line 22. The inflator 24 has a housing 64 with a generally tubular shape, around which the inlet port 42 may be sealed.

The inflator 24 also has a plug/initiator assembly 66, a can 68, an orifice plate 70, and a screen 72 contained within the housing 64. The orifice plate 70 is disposed between the can 68 and the screen 72. The can 68 contains a quantity of generant 74 and a baffle 76, as will be described in greater detail subsequently.

The housing 64 has a first end 80 disposed at the first end 60 of the inflator 24 and a second 82 disposed at the second end 62 of the inflator 24. Thus, when installed in the vehicle 12, the housing 64 may be oriented such that the first end 80 is generally above the second end 82, as illustrated in FIG. 1. The housing 64 also has a first crimp 84 formed in the first end 80 and a second crimp 86 formed in the second end 82. The housing 64 also has a plurality of outlet ports 88 formed in the second end 82. The outlet ports 88 may be distributed around the circumference of the second end 82 so that inflation gas exiting the second end 82 through the outlet ports 88 produces substantially no thrust against the inflator 24.

As shown, the plug/initiator assembly 66 is disposed to hermetically seal the generant 74 and the baffle 76 within the can 68. More precisely, the plug/initiator assembly 66 has an outer shoulder 100, which may butt up against an outer lip 101 of the can 68. The outer shoulder 100 may be sized just smaller than the interior diameter of the housing 64. The plug/initiator assembly 66 also has an intermediate shoulder 102 sized to fit within the outer lip 101 of the can 68.

The plug/initiator assembly 66 also has an inner shoulder 104 sized somewhat smaller than the intermediate shoulder 102. An O-ring 106 is disposed around the inner shoulder 104 and is compressed against the interior diameter of the can 68 proximate the outer lip 101. The O-ring 106 forms a hermetic seal between the can 68 and the plug/initiator assembly 66. The hermetic seal prevents ambient air from contacting the generant 74 to ensure that the generant 74 has a long viable life.

The plug/initiator assembly 66 also has an interior shoulder 108 sized to fit around the adjacent portion of the baffle 76. At the opposite end, the plug/initiator assembly 66 has a receptacle 110 designed to receive a plug coupled to the electric lines 22 or to the associated electronic control unit. The receptacle 110 contains a pair of pins 112 that receive the activation signal and conduct it to a combustion head 114 extending toward the second end 62 from within the interior shoulder 108.

As shown, the plug/initiator assembly 66 includes an initiation charge integrated with a plug housing. In other embodiments, an initiator may be retained within a separate plug housing that is shaped to seal against the can 68. The combustion head 114 of the plug/initiator assembly 66 may include a pyrotechnic charge that is designed to produce enough initiation gas to ignite the generant 74 independently of any separate igniter material, when used in conjunction with the baffle 76. According to one example, the plug/initiator assembly 66 contains about 60 mg of zirconium potassium perchlorate ("ZPP") and about 445 mg of titanium hydride potassium perchlorate ("THPP"). The plug/initiator assembly 66 or a portion thereof is manufactured and/or sold as part no. 602101200B, from Autoliv ASP.

A damper pad 120 is disposed between the inner shoulder 104 and the generant 74. The damper pad 120 is resilient and presses against the generant 74 and keeps the individual pellets or granules from rattling against each other. The damper pad 120 may be made of a fiberglass, a silicon-based foam rubber, or the like.

The baffle 76 is uniquely configured to perform multiple functions. More precisely, the baffle 76 operates to conduct initiation gas from the combustion head 114 to the generant 74 in such a manner that the generant 74 ignites reliably and relatively evenly without the need for an intermediate igniter material. Nevertheless, additional igniter material may be advantageously disposed within the baffle 76, proximate the plug/initiator assembly 66. The baffle 76 also collects the inflation gas produced by the generant 74 and conducts it toward the second end 62 of the inflator 24. In this application, "additional igniter material" refers to pyrotechnic material disposed outside an initiator to provide additional initiation gas and/or heat, thereby expediting the combustion of an inflation gas generant and/or expediting the expansion of a body of compressed material to provide inflation gas.

The baffle 76 has a wall 122 with a generally tubular shape. The wall 122 has a first end 124 disposed toward the first end 80 of the housing 64 and a second end 126 disposed toward the second end 82 of the housing 64. The wall 122 also has a central portion 128 disposed between the first and second ends 124, 126. A blockage is disposed at the central portion 128 to restrict fluid from moving directly through the baffle 76. In the embodiment of FIG. 2, the blockage takes the form of a three-way crimp 130 formed by compressing three sides 132 of the central portion 128 inward to contact each other. The three-way crimp 130 will be further illustrated in connection with FIG. 3.

The baffle 76 also has a flange 134 that extends outward from and generally perpendicular to the wall 122. The flange 134 is generally annular in shape. The flange 134 has a lip 136 that curves to match the curvature of the end of the can 68 that is disposed toward the orifice plate 70. The flange 134 and the lip 136 function to center and align the baffle 76 within the can 68 to define a compartment 140, generally concentric with the can 68, in which the generant 74 resides. Other devices and/or features may alternatively also be used to align the baffle 76 with the can 68. The compartment 140 has a generally annular shape so that the generant 74 encircles the wall 122 of the baffle 76.

The wall 122 defines a passageway 142 within the baffle 76. The passageway 142 has a first end 144 encircled by the first end 124 of the wall 122 and a second end 146 encircled by the second end 126 of the wall 122. The passageway 142 has a first aperture 148 at the first end 144 and a second aperture 149 at the second end 146. In addition to the apertures 148, 149, a plurality of first end holes 150 are formed in the first end 124 of the wall 122 and a plurality of second end holes 152 are formed in the second end 126 of the wall 122.

The first and second end holes 150, 152 are distributed along the length and about the diameter of the wall 122. The first and second end holes 150, 152 are open to provide continuous fluid communication between the compartment 140 and the first and second ends 144, 146 of the passageway 142. Direct fluid communication between the first and second ends 144, 146 is restricted by the three-way crimp 130 formed in the central portion 128 of the wall 122.

The can 68 has an outlet portion 160 disposed adjacent to the orifice plate 70 and aligned with an outlet orifice 162 formed in the orifice plate 70. The screen 72 has a cavity 164 adjacent to the outlet orifice 162. The outlet portion 160 of the can 68 may be frangible so that the outlet portion 160 is able to reliably burst under the pressure increase incident to combustion of the generant 74. The outlet portion 160 may have scores or other structures designed to facilitate bursting, or may simply be thin-walled. The screen 72 may be constructed of a wire mesh such as may be obtained from the ACS Industries Corporation of Woonsocket, R.I.

The baffle 76 helps distribute initiation gasses and collect inflation gasses during deployment of the inflator 24 to provide comparatively reliable and controllable expulsion of inflation gas into the cushion 11. In response to detection of a collision, an activation signal is transmitted to the pins 112 of the plug/initiator assembly 66. The activation signal is conveyed to the combustion head 114 via the pins 112. The activation signal ignites a pyrotechnic charge (not shown) within the combustion head 114.

The pyrotechnic charge within the combustion head 114 substantially vaporizes to produce heated initiation gas 170. In this application, "initiation gas" refers to gas at a temperature and volume suitable for initiating combustion of a gas generant material. The initiation gas 170 may not have a sufficient volume to inflate the cushion 11 alone.

The first end 144 of the passageway 142 is shaped to distribute the initiation gas 170 over a comparatively large area of the generant 74. More precisely the first end 144 extends along nearly half of the generant 74 before terminating at the three-way crimp 130. The first end holes 150 are sized and distributed in such a manner that the initiation gas 170 comparatively evenly diffuses through the first end holes 150 to reach the generant 74.

The structure of the baffle 76 acts to absorb some of the shock of the initiation gas 170 so that the generant 74 is not pulverized by the emerging initiation gas 170. This is beneficial because the surface area of the generant 74 that is able to commence reacting is relatively predictable. Contrarily, pulverization of the generant 74 may increase the available surface area, thereby elevating the reaction rate of the generant 74 temporarily above desirable levels. The result would be excessive stress on the cushion 11 and an excessively forceful inflation.

The first end holes 150 may be large enough to avoid significantly restricting flow of the initiation gas 170. The first end holes 150 may also be small enough to still permit the wall 122 to absorb the shock of combustion of the combustion head 114. According to one example, the first and second end holes 150, 152 may each be generally circular in shape, with diameters ranging from about 0.025 inches to about 0.2 inches. More precisely, the first and second holes 150, 152 may have diameters ranging from about 0.05 inches to about 0.1 inches. Further, the first and second holes 150, 152 may have diameters ranging from about 0.063 inches to about 0.090 inches. If desired, the first and second holes 150, 152 may each be about 0.075 inches in diameter.

The configuration of the first end 144 illustrated in FIG. 2 is only one of many possible embodiments. If desired, the first end 124 of the wall 122 may be shaped differently, or the first end holes 150 may be distributed, sized, or shaped differently to provide the desirable distribution of initiation gas 170 into the generant 74. The wall 122 need not be generally cylindrical in shape, but may have any shape that forms a passageway adjacent to which a generant material can be disposed. The three-way crimp 130 also need not be disposed at the position shown, but may be located at many different positions along the length of the baffle 76.

The generant 74 receives the initiation gas 170 and ignites. Combustion of the generant 74 produces inflation gas 172, which flows from the compartment 140 into the second end 146 of the passageway 142 via the second end holes 152, as illustrated. Within a few milliseconds, substantially all of the generant 74 is burning. The generant 74 produces inflation gas at a rate sufficient to inflate the cushion 11 to interpose the cushion 11 between the vehicle occupant and the front door 17 prior to impact of the occupant with the front door 17.

The second end holes 152 permit the inflation gas 172 to flow into the second end 146 with little obstruction relative to the outlet orifice 162 of the orifice plate 70. The second end 126 of the wall 122 helps to block entry of solid particles into the second end 146 of the passageway 142, thereby cleansing the inflation gas 172. The second end holes 152 may be sized, shaped, and distributed in a manner similar to that of the first end holes 150, as described above. In alternative embodiments, the second end holes 152 may also be sized, shaped, or distributed in a wide variety of different ways. The second end 126 of the wall 122 may also be shaped differently to provide the desired inflation gas collection characteristics for the second end 146 of the passageway 142.

As shown, the second end 146 of the passageway 142 may be slightly longer than the first end 144 of the passageway 142. Thus, the second end holes 152 may be slightly more numerous than the first end holes 150. In the embodiment of FIG. 2, the first end holes 150 include four circular arrays of six holes each, for a total of twenty-four first end holes 150. The second end holes 152 include five circular arrays of six holes each, for a total of thirty second end holes 152. The use of several first and second end holes 150, 152 helps to provide more effective internal gas diffusion and gas collection.

From the second end 146 of the passageway 142, inflation gas 174 at comparatively high pressure bursts through the outlet portion 160 of the can 68 and passes through the outlet orifice 162 of the orifice plate 70. The inflation gas 174 passes into the cavity 164 of the screen 72, and thence enters the screen 72. Within the screen 72, additional particulate matter and heat are removed from the inflation gas 174 to further refine and cool the inflation gas. The inflation gas 174 moves through the screen 72 to the outlet ports 88 of the housing 64. The inflation gas 174 then exits the housing 64 via the outlet ports 88 to enter the interior of the cushion 11, thereby inflating the cushion 11 to provide impact protection.

The outlet orifice 162 is sized to present a flow restriction to the inflation gas 174. More precisely, the size of the outlet orifice 162 is selected in such a manner that the inflation gas 174 flows from the can 68 at the desired rate. If the inflation gas 174 exits the can 68 too rapidly, there will be excessive stress on the cushion 11 and excessively forceful inflation, as described above. Furthermore, the generant 74 reacts at a rate that is related to the pressure of the gas within the can 68. Thus, the can 68 may be maintained at an elevated pressure to expedite combustion of substantially all of the generant 74.

The second end holes 152 may have a total flow area that is well above that of the outlet orifice 162 so that the flow rate of inflation gas from the inflator 24 can be tuned by simply varying the size of the outlet orifice 162. According to one example, the second end holes 152 provide a gas flow area approximately double that of the outlet orifice 162. Thus, partial blockage of the second end holes 152 by solid combustion products is unlikely to reduce the flow area of the second end holes 152 enough to significantly restrict flow of the inflation gas 172 into the second end 146 of the passageway 142.

The first crimp 84 acts to keep the plug/initiator assembly 66 within the first end 80 of the housing 64. Similarly, the second crimp 86 keeps the orifice plate 70 and the can 68 in their proper positions within the housing 64 and ensures that the screen 72 is not compacted by movement of the orifice plate 70. Thus, the inflator 24 remains intact during deployment.

The inflator 24 may be comparatively rapidly and easily manufactured. First, the various parts of the inflator 24 may be individually manufactured. The housing 64 may be formed of steel by stamping, casting, extrusion, or any other suitable procedure. The plug/initiator assembly 66 may be made by, for example, casting a nonconductive metal, plastic, or ceramic around the pins 112 and the combustion head 114 to obtain the shape illustrated in FIG. 2. The can 68 may be formed of comparatively thin brass by stamping, casting, extrusion, or the like. The orifice plate 70 may be stamped to the desired annular shape from a sheet of stock sized steel.

The screen 72 may be cut or pressed into the desired shape. The generant 74 may be manufactured through known chemical methods. As illustrated in FIG. 2, the generant 74 may consist of pellets of pyrotechnic material, each of which has a generally cylindrical shape. Each pellet may have an outside diameter ranging from about 0.125 inches to about 0.188 inches. The generant 74 is not limited to annular shapes, but may include a wide variety of shapes, such as spherical, pyramidal, triangular prismoidal, and rectangular prismoidal shapes. The baffle 76 may be manufactured in a number of ways, one of which will be illustrated in FIG. 3.

According to one assembly procedure, the outlet ports 88 are stamped or otherwise formed in the second end 82 of the housing 64. Then, the screen 72 is inserted into the first end 80 of the housing 64 and pushed into the second end 82. The second crimp 86 is then formed to keep the screen 72 in place and ensure that it is not compacted. The orifice plate 70 is inserted into the first end 80 and moved toward the second end 82 until it abuts the screen 72 and the second crimp 86. Alternatively, the orifice plate 70 may be inserted prior to formation of the second crimp 86.

The baffle 76 is then inserted into the can 68 with the flange 134 positioned toward the outlet portion 160. The generant 74 is then inserted into the resulting compartment 140 between the wall 122 of the baffle 76 and the can 68. The damper pad 120 is inserted into the compartment 140 and pressed against the generant 74. Then, the can 68 (with the generant 74, the baffle 76, and the damper pad 120) is inserted into the first end 80 of the housing 64 and moved to abut the orifice plate 70.

The O-ring 106 is then inserted onto the inner shoulder 104 of the plug/initiator assembly 66 and the plug/initiator assembly 66 is inserted into the first end 80 of the housing 64. The O-ring 106 forms a hermetic seal between the plug/initiator assembly 66 and the can 68. If desired, the plug/initiator assembly 66 and the can 68 may be coupled together within an evacuated chamber or a chamber filled with an inert gas. The plug/initiator assembly 66 and the can 68 may also be coupled together prior to insertion of the can 68 into the housing 64, if desired.

After the plug/initiator assembly 66 and the can 68 have been coupled together and inserted into the housing 64, the first crimp 84 is formed in the first end 80 of the housing 64 to retain the plug/initiator assembly 66 within the housing. The first crimp 84 is formed with a smaller interior diameter than the diameter of the outer shoulder 100 of the plug/initiator assembly 66 so that the outer shoulder 100 is unable to move past the first crimp 84 to exit the first end 80 of the housing 64. The inflator 24 is then ready for installation in the front seat 16 of the vehicle 12.

FIG. 2 also illustrates, in phantom, a quantity of additional igniter material 175 disposed within the first end 144 of the passageway 142 of the baffle 76. The additional igniter material 175 may optionally be added to augment the initiation gas 170, thereby expediting combustion of the generant 74. The igniter material 175 then simply combusts in response to combustion of the combustion head 114 to produce heat and/or additional gas. The igniter material 175 is not required in all embodiments, and may be omitted to simplify the construction of the inflator 24.

The baffle 76 may be manufactured according to many different methods. One such method will be described in connection with FIG. 3.

Figure 3:
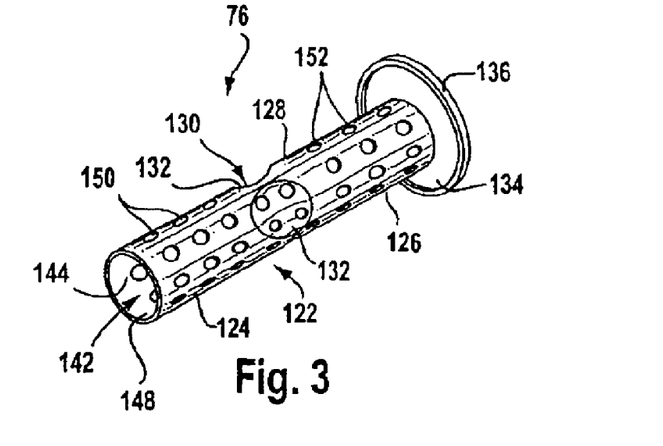
FIG. 3 is a perspective view of the baffle of the inflator of FIG. 1.

Referring to FIG. 3, a perspective view illustrates the baffle 76 shown in FIG. 2. As mentioned previously, the baffle has a three-way crimp 130 formed in the central portion 128 of the wall 122. The three-way crimp 130 may be formed by pressing the three sides 132 of the central portion 128 inward to meet each other. As a consequence, a blockage is formed in the central portion 128 to minimize direct fluid communication between the first and second ends 144, 146 of the passageway 142.

The three-way crimp 130 may, for example, be formed by utilizing a collet (not shown) with three teeth that extend inward to press against the three sides 132. The teeth move inward until the three sides 132 meet to form the blockage. In this application, the term "blockage" does not require an absolute gastight seal within the central portion 128. Rather, a blockage is simply a structure that diverts the great majority of the initiation gas 170, forcing it to enter the compartment 140 via the first end holes 150 rather than passing directly from the first end 144 to the second end 146 of the passageway 142.

As mentioned previously, a baffle according to the invention may be configured in a wide variety of ways. Furthermore, several different blockage types may be used. Alternative blockages will be shown and described in connection with FIGS. 4 and 5, as follows.

Figure 4:
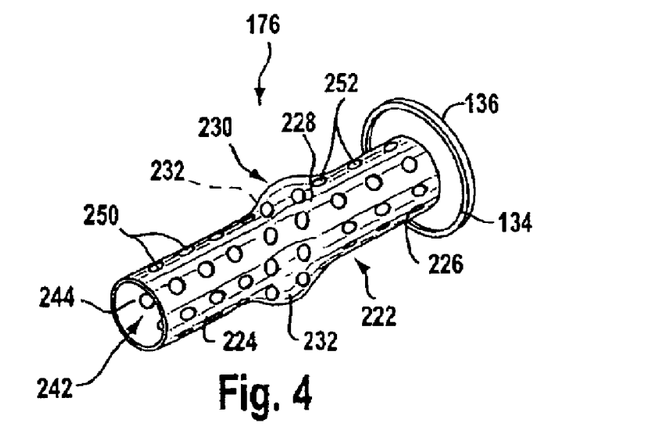
FIG. 4 is a perspective view of a baffle according to an alternative embodiment of the invention.

Referring to FIG. 4, a perspective view illustrates a baffle 176 according to one alternative embodiment of the invention. The baffle 176 has a wall 222 with a generally tubular shape. The wall 222 has a first end 224, a second end 226, and a central portion 228 disposed between the first and second ends 224, 226. A blockage is formed in the central portion 228, in the form of a two-way crimp 230. The two-way crimp 230 may be formed by compressing two sides 232 of the central portion 228 between two hard abutments such as rollers. The two sides 232 press inward toward each other to meet in the center of the central portion 228. The two sides 232 flatten and widen past the initial diameter of the central portion 228.

The wall 222 of the baffle 176 defines a passageway 242 with a first end 244 within the first end 224 of the wall 222 and a second end within the second end 226 of the wall 222. Direct fluid communication between the first and second ends of the passageway 242 is restricted by the two-way crimp 230. A plurality of first end holes 250 are formed in the first end 224 of the wall 222, and a plurality of second end holes 252 are formed in the second end 226 of the wall 222. The installation and operation of the baffle 176 are substantially the same as illustrated previously, in connection with the baffle 76.

Figure 5:
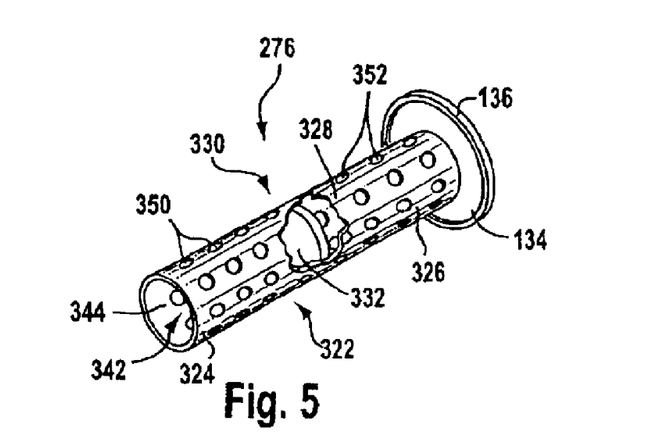
FIG. 5 is a perspective view of a baffle according to yet another alternative embodiment of the invention.

Referring to FIG. 5, a perspective view illustrates a baffle 276 according to another alternative embodiment of the invention. The baffle 276 has a wall 322 with a generally tubular shape. The wall 322 has a first end 324, a second end 326, and a central portion 328 disposed between the first and second ends 324, 326. A blockage 330 is formed in the central portion 328, in the form of a plug 332. The plug 332 may or may not be integrally formed with the central portion 328. According to one example, the plug 332 may be inserted into the central portion 328 and attached to the interior wall of the central portion 328. The plug 332 may, for example, be a steel plate welded to the central portion 328.

The wall 322 of the baffle 276 defines a passageway 342 with a first end 344 within the first end 324 of the wall 322 and a second end within the second end 326 of the wall 322. Direct fluid communication between the first and second ends of the passageway 342 is restricted by the plug 332. A plurality of first end holes 350 are formed in the first end 324 of the wall 322, and a plurality of second end holes 352 are formed in the second end 326 of the wall 322. The installation and operation of the baffle 276 are substantially the same as illustrated previously, in connection with the baffle 76.

Many other aspects of the inflator 24 may be varied to suit the geometry of the vehicle 12, the size and shape of the cushion 11, and the available manufacturing equipment. Such variations may be recognized and implemented by those of skill in the art to produce a larger number of embodiments of the invention than can be illustrated or specifically described herein.

The simplified baffle systems and associated methods of the present invention provide a significant advancement in airbag inflator design. More specifically, inflators may be more inexpensively produced due to the omission of igniter materials and multi-part internal gas distribution/collection assemblies. Gas may still be delivered reliably and efficiently to the cushion to provide effective impact protection.

The present invention may be embodied in other specific forms without departing from its structures, methods, or other essential characteristics as broadly described herein and claimed hereinafter. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed is:

1. An inflator for inflating a cushion of an airbag system for protecting an occupant of a vehicle from impact, the inflator comprising:

a baffle comprising a passageway having a first end and a second end, the baffle having a blockage disposed to restrict fluid from flowing between the first and second ends without first leaving the passageway, the baffle having a plurality of first end holes formed proximate the first end and a plurality of second end holes formed proximate the second end;

an initiator disposed to direct initiation gas into the first end in response to receipt of an activation signal; and a quantity of generant disposed outside the passageway to receive the initiation gas through the first end holes, combust in response to receipt of the initiation gas to produce inflation gas, and eject the inflation gas into the second end through the second end holes.

2. The inflator of claim 1, wherein the baffle comprises a wall with a tubular shape that defines a generally circular cross sectional shape of the passageway.

3. The inflator of claim 2, wherein the blockage comprises a three-way crimp formed in the wall.

4. The inflator of claim 1, further comprising a housing having a first end in which the initiator and the first end of the passageway are disposed and a second end in which the second end of the passageway is disposed, the second end of the housing having an outlet orifice disposed to release the inflation gas into a region in fluid communication with the cushion.

5. The inflator of claim 4, wherein the baffle comprises a first aperture formed in the first end of the passageway proximate the initiator and a second aperture disposed in the second end of the passageway proximate the outlet orifice.

6. The inflator of claim 4, further comprising a can disposable within the housing to form a hermetic seal around the initiator, the baffle, and the generant.

7. The inflator of claim 6, wherein the can comprises an open end, the inflator further comprising a plug integrally formed with the initiator and shaped to seal the open end.

8. The inflator of claim 1, wherein the first end of the baffle is shaped to conduct the initiation gas to the generant through the first end holes without reaction with any additional igniter material within the passageway to induce combustion of the generant with a speed sufficient to inflate the cushion to interpose the cushion between the occupant and an interior surface of the vehicle prior to impact of the occupant with the interior surface.

9. The inflator of claim 1, further comprising a quantity of additional igniter material disposed within the first end of the baffle to supplement the initiation gas, wherein the first end of the baffle is shaped to conduct the initiation gas to the generant through the first end holes to induce combustion of the generant with a speed sufficient to inflate the cushion to interpose the cushion between the occupant and an interior surface of the vehicle prior to impact of the occupant with the interior surface.

10. An inflator for inflating a cushion of an airbag system for protecting an occupant of a vehicle from impact against an interior surface of the vehicle, the inflator comprising:

an initiator that provides initiation gas in response to receipt of an activation signal;

a baffle having a passageway disposed to receive the initiation gas, the baffle having a plurality of holes;

a quantity of generant disposed outside the passageway to receive the initiation gas through the holes;

wherein the baffle is shaped to conduct the initiation gas to the generant through the holes without reaction with any additional igniter material within the passageway to induce combustion of the generant with a speed sufficient to inflate the cushion to interpose the cushion between the occupant and the interior surface prior to impact of the occupant with the interior surface, wherein the passageway has a first end and a second end, the inflator further comprising a housing having a first end in which the initiator and the first end of the passageway are disposed and a second end in which the second end of the passageway is disposed, the second end of the housing having an outlet orifice disposed to release an inflation gas into a region in fluid communication with the cushion; and a can disposed to form a hermetic seal around the initiator, the baffle, and the generant.

11. The inflator of claim 10, wherein the baffle comprises a wall with a tubular shape that defines a generally circular cross sectional shape of the passageway.

12. The inflator of claim 10, wherein the baffle comprises a blockage disposed to restrict fluid from flowing between the first and second ends of the passageway without first leaving the passageway, the first end of the passageway terminating in a first aperture adjacent to the initiator, and the second end of the passageway terminating in a second aperture adjacent to the outlet orifice.

13. The inflator of claim 10, wherein the can comprises an open end, the inflator further comprising a plug integrally formed with the initiator and shaped to seal the open end.

14. An inflator for inflating a cushion of an airbag system for protecting an occupant of a vehicle from impact against an interior surface of the vehicle, the inflator comprising:

an initiator that provides initiation gas in response to receipt of an activation signal;

a baffle having a passageway disposed to receive the initiation gas, the baffle having a plurality of holes, wherein the passageway comprises a first end and a second end;

a quantity of additional igniter material disposed within a first end of the baffle to supplement the initiation gas; and a quantity of generant disposed outside the passageway to receive the initiation gas through the holes;

wherein the baffle is shaped to conduct the initiation gas to the generant through the holes to induce combustion of the generant with a speed sufficient to inflate the cushion to interpose the cushion between the occupant and the interior surface prior to impact of the occupant with the interior surface, wherein the baffle further comprises a blockage disposed to restrict fluid from flowing between the first and second ends of the passageway without first leaving the passageway.

15. An airbag module for protecting an occupant of a vehicle from impact, the airbag module comprising:

a cushion disposable to inflate to cushion impact of the occupant with the vehicle; and an inflator disposable to inflate the cushion, the inflator comprising a housing having a first end shaped to receive an initiator and a second end with an outlet orifice formed therein, and a baffle comprising a passageway having a first end disposed within the first end of the housing and a second end disposed within the second end of the housing, the baffle having a blockage disposed to restrict fluid from flowing between the first and second ends of the passageway without first leaving the passageway, wherein the baffle defines a compartment outside of the passageway, the baffle having a plurality of first end holes formed proximate the first end of the passageway to permit gas to flow between the first end of the passageway and the compartment and a plurality of second end holes formed proximate the second end of the passageway to permit gas to flow between the compartment and the second end of the passageway.

16. The airbag module of claim 15, wherein the inflator further comprises:

an initiator disposed within the first end of the housing to deploy to convey initiation gas into the first end of the passageway in response to receipt of an activation signal; and a quantity of generant disposed within the compartment to receive the initiation gas through the first end holes and to combust in response to receipt of the initiation gas to produce inflation gas.

17. The airbag module of claim 16, wherein the baffle is shaped to conduct the initiation gas to the generant through the first end holes without reaction with any additional igniter material within the first end of the passageway to induce combustion of the generant with a speed sufficient to inflate the cushion to interpose the cushion between the occupant and an interior surface of the vehicle prior to impact of the occupant with the interior surface.

18. The airbag module of claim 16, further comprising a quantity of additional igniter material disposed within the first end of the baffle to supplement the initiation gas, wherein the first end of the baffle is shaped to conduct the initiation gas to the generant through the first end holes to induce combustion of the generant with a speed sufficient to inflate the cushion to interpose the cushion between the occupant and an interior surface of the vehicle prior to impact of the occupant with the interior surface.

19. The airbag module of claim 15, wherein the baffle comprises a wall with a tubular shape that defines a generally circular cross sectional shape of the passageway, and wherein the housing comprises a generally tubular shape substantially coaxial with the wall.

20. An airbag module for protecting an occupant of a vehicle from impact, the airbag module comprising:

a cushion disposable to inflate to cushion impact of the occupant with the vehicle; and an inflator disposable to inflate the cushion, the inflator comprising an initiator, a baffle, and a quantity of generant, wherein the initiator is deployable in response to receipt of an activation signal to direct initiation gas into a passageway of the baffle, the baffle having a plurality of holes and a shape selected to direct the initiation gas from the initiator, out of the passageway, and to the generant via the holes without reaction with any additional igniter material disposed within the passageway to induce combustion of the generant with a speed sufficient to inflate the cushion to interpose the cushion between the occupant and an interior surface prior to impact of the occupant with the interior surface, wherein the passageway terminates in a first aperture proximate a first end of the baffle and a second aperture proximate a second end of the baffle, wherein the baffle comprises a blockage disposed to restrict fluid from flowing between the first and second apertures without first leaving the passageway.

21. The airbag module of claim 20, further comprising a housing having a first end shaped to receive the initiator and a second end with an outlet orifice formed therein, wherein the baffle comprises a wall with a tubular shape that defines a generally circular cross sectional shape of the passageway, the housing having a generally tubular shape substantially coaxial with the wall.

22. An airbag module for protecting an occupant of a vehicle from impact, the airbag module comprising:

a cushion disposable to inflate to cushion impact of the occupant with the vehicle; and an inflator disposable to inflate the cushion, the inflator comprising an initiator, a baffle, a quantity of additional igniter material, and a quantity of generant, wherein the initiator is deployable in response to receipt of an activation signal to direct initiation gas into a passageway of the baffle, wherein the additional igniter material is disposed at least partially within the passageway, the baffle having a plurality of holes and a shape selected to direct the initiation gas from the initiator, out of the passageway, and to the generant via the holes to induce combustion of the generant with a speed sufficient to inflate the cushion to interpose the cushion between the occupant and an interior surface prior to impact of the occupant with the interior surface, wherein the passageway comprises a first end and a second end, the baffle further comprises a blockage disposed to restrict fluid from flowing between the first and second ends of the passageway without first leaving the passageway.

23. A baffle for channeling gas flows within an inflator for inflating a cushion of an airbag system for protecting an occupant of a vehicle from impact, the baffle comprising:

a first end having a plurality of first end holes disposed to release an initiation gas from the first end;

a second end having a plurality of second end holes disposed to permit entry of inflation gas into the second end and an aperture disposed to release the inflation gas from the second end; and a blockage disposed between the first and second ends to restrict initiation gas from passing directly from the first end to the second end.

24. The baffle of claim 23, wherein the first end comprises a first aperture disposed to encircle an initiator so that deployment of the initiator forms initiation gas within the first end.

25. The baffle of claim 23, wherein the first and second ends are formed by a wall having a generally tubular shape.

26. The baffle of claim 25, further comprising a flange integrally formed with the wall and extending substantially perpendicular to an axis of the wall.

27. The baffle of claim 25, wherein the blockage is formed separately from the wall and fixedly attached within the wall.

28. The baffle of claim 25, wherein the blockage comprises a crimp formed by deforming a central portion of the wall.

29. The baffle of claim 28, wherein the crimp comprises a three-way crimp formed by pressing three sides of the central portion inward to meet proximate an axis of the wall.

30. The baffle of claim 23, wherein each of the first end holes and the second end holes has a size ranging from about 0.063 inches to about 0.090 inches.

31. The baffle of claim 23, wherein the first end comprises at least nine first end holes, and wherein the second end comprises at least nine second end holes.

32. The baffle of claim 23, wherein the blockage is integrally formed with the first and second ends.

33. An inflator for inflating a cushion of an airbag system for protecting an occupant of a vehicle from impact, the inflator comprising:

an initiator that provides initiation gas in response to receipt of an activation signal;

a quantity of generant; and a baffle comprising a first end, a second end, and a blockage, wherein the first end comprises a first aperture disposed to receive the initiation gas and a plurality of first end holes disposed to permit passage of the initiation gas from the first end to the generant, wherein the second end comprises a plurality of second end holes disposed to permit entry of inflation gas into the second end from the generant and a second aperture disposed to release the inflation gas from the second end, wherein the blockage is integrally formed with and disposed between the first and second ends to restrict the initiation gas from passing directly from the first end to the second end.

34. A method for inflating a cushion of an airbag module through the use of an inflator having an initiator, a baffle, and a quantity of generant, the baffle having a passageway with a plurality of holes, the method comprising:

applying an activation signal to trigger deployment of the initiator to produce initiation gas;

conveying the initiation gas into the passageway;

directing the initiation gas from the passageway to the generant via the holes without reaction of the initiation gas with any additional igniter material disposed within the passageway; and igniting the generant with the initiation gas to produce inflation gas with a speed sufficient to inflate the cushion to interpose the cushion between the occupant and an interior surface prior to impact of the occupant with the interior surface, wherein the passageway comprises a first end and a second end, the baffle comprising a blockage disposed to restrict fluid flow within the passageway between the first and second ends, the holes comprising a plurality of first end holes formed proximate the first end and a plurality of second end holes formed proximate the second end, the method further comprising conveying the inflation gas into the second end through the second end holes.

35. The method of claim 34, wherein the inflator further comprises a housing having a first end in which the initiator and the first end of the passageway are disposed and a second end in which the second end of the passageway is disposed, the second end of the housing having an outlet orifice, the method further comprising conveying the inflation gas from the second end of the passageway, through the outlet orifice, and into a region in fluid communication with the cushion.

36. A method for inflating a cushion of an airbag module through the use of an inflator having an initiator, a baffle, a quantity of additional igniter material, and a quantity of generant, the baffle having a passageway with a plurality of holes and a blockage, the passageway comprising a first aperture and a second aperture, the first aperture disposed to receive an initiation gas and the second aperture disposed to disposed to release an inflation gas, wherein the additional igniter material is disposed at least partially within the passageway, the method comprising:

applying an activation signal to trigger deployment of the initiator to produce initiation gas;

conveying the initiation gas into the passageway;

igniting the additional igniter material to supplement the initiation gas;

directing the initiation gas from the passageway with the blockage to the generant via the holes, wherein the blockage restricts the initiation gas from flowing between the first aperture and the second aperture of the passageway without first leaving the passageway; and igniting the generant with the initiation gas to produce inflation gas with a speed sufficient to inflate the cushion to interpose the cushion between the occupant and an interior surface prior to impact of the occupant with the interior surface.

* * * * *